O. BROCKMAN.
BREAST ATTACHMENT FOR HARNESS.
APPLICATION FILED DEC. 11, 1909.
1,008,692.
Patented Nov. 14, 1911.
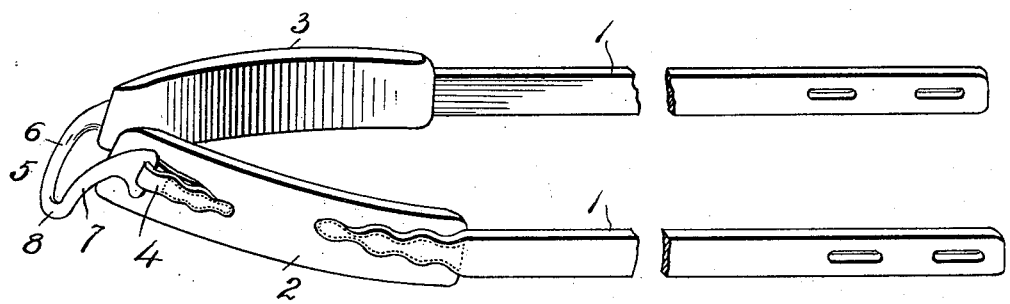
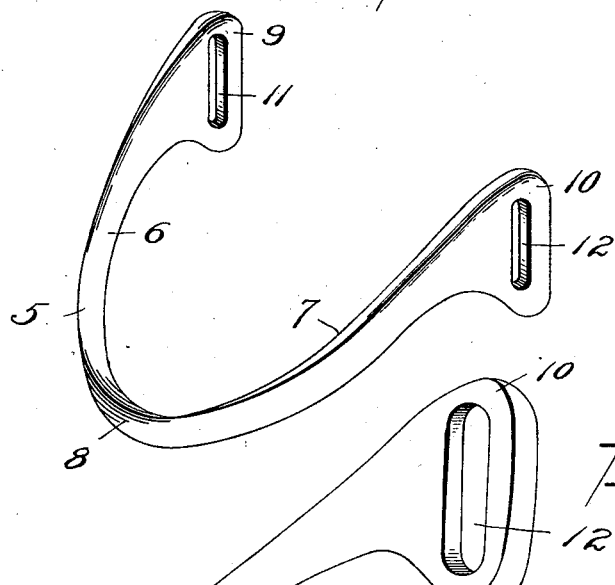
Witnesses
Inventor
Oscar Brockman
By his Attorneys

UNITED STATES PATENT OFFICE.

OSCAR BROCKMAN, OF LOUISVILLE, KENTUCKY.

BREAST ATTACHMENT FOR HARNESS.

1,008,692.  Specification of Letters Patent.  Patented Nov. 14, 1911.

Application filed December 11, 1909. Serial No. 532,670.

*To all whom it may concern:*

Be it known that I, OSCAR BROCKMAN, a citizen of the United States, residing at Louisville, in the county of Jefferson and State of Kentucky, have invented certain new and useful Improvements in Breast Attachments for Harness; and I do hereby declare the following to be a full, clear, and exact description of the invention, such as will enable others skilled in the art to which it appertains to make and use the same.

This invention relates to improvements in breast collar attachments for harness, and has for an object the provision of improved means connected to the breast collar or other draft means for holding the breast collar or the like properly in position, and yet leave the throat of the animal upon which it is placed free and clear of contact.

Another object of the invention is the arrangement in a harness attachment, of means for holding the breast collar, or the like, properly in position, which extends outwardly and downwardly for positively leaving the throat and wind-pipe entirely free and clear from any constriction.

A further object of the invention is the arrangement of an attachment for breast collars, the metal curved downwardly so as to appear crescent-shaped from the front, and also curved outwardly for spacing the attachment from the throat of the animal upon which the same is placed, the attachment also being formed with loops or eyelets for receiving the breast straps or traces.

With these and other objects in view the invention comprises certain novel constructions, combinations and arrangement of parts as will be hereinafter more fully described and claimed.

In the accompanying drawings: Figure 1 is a perspective view of a pair of traces and breast straps connected by an attachment embodying the invention. Fig. 2 is a perspective view of the attachment. Fig. 3 is a side view of the attachment.

Referring to the accompanying drawings by numerals, 1 indicates a trace of any kind of harness, and 2 and 3 the breast straps. Breast collars or straps of other kinds may have the attachment secured thereto, the breast strap shown being merely for the purpose of illustrating the invention. Connected with straps 2 and 3 by securing straps 4—4 is the attachment 5 which curves downwardly and outwardly for forming a substantially U-shaped structure. The attachment 5 is preferably slightly restricted at 6 and 7, and slightly enlarged at 8 for causing the attachment to give or spring slightly but to firmly maintain the breast straps 2 and 3 in position. This structure also, by its curving lines, adds to the appearance of the harness, as well as yieldingly, though firmly, holding the collar or breast straps in position. At the ends of the attachment are formed enlargements 9 and 10 in which are located slots 11 and 12 through which the straps 4—4 are designed to pass in securing the attachment in position. It will be observed that the slots 11 and 12 are at a slightly less angle than a right angle to the general direction of the attachment, so as to permit the attachment to extend downwardly as well as forwardly.

By arranging an attachment as 5, means are supplied which will eliminate any constriction or interference with the horse's breathing when working in the harness. The attachment is designed to be finished so as to afford an ornamentation to the harness as well as means for holding the harness in proper position, and yet permitting the proper breathing of the horse.

What I claim is:

A harness comprising breast straps secured to traces and spaced from each other at their outer ends and having loops connected to the outer faces thereof, and an attachment for said breast straps consisting of a U-shaped metallic member provided with oppositely disposed enlarged ends having vertical slots therein which are connected to said loops, the curved body portion of said attachment spanning the spaced ends of the breast straps and extending outwardly and downwardly therefrom so as to leave the throat and wind pipe of the animal entirely free and clear of any constriction.

In testimony whereof I affix my signature in presence of two witnesses.

OSCAR BROCKMAN.

Witnesses:
JOHN M. WIRTH,
AUGUST B. ELLETT.

Copies of this patent may be obtained for five cents each, by addressing the "Commissioner of Patents, Washington, D. C."